Patented Mar. 3, 1942

2,274,874

UNITED STATES PATENT OFFICE 2,274,874

PROCESS FOR TREATING FRUITS, ETC.

Otto J. Steinwand, Oakland, Calif., assignor to S & W Fine Foods, Inc., San Francisco, Calif., a corporation of California No Drawing. Application October 23, 1939, Serial No. 300,791

8 Claims. (Cl. 99—102).

My present invention relates to a process for treating fruits, especially grapes and citrus fruits or peel, as a preliminary to coloring, canning, pickling, preserving, glazing and candying, as practiced in the preparation of such products.

The object of my invention is to provide a process of treatment for fruits, and more particularly grapes and the like, which will render the pulp firm and the skins impervious to cracking or splitting when immersed in cold, hot or boiling water, and also more susceptible to coloring and the absorption of sugars and flavoring.

In the treatment of grapes and the like, I have discovered that by soaking the fruit in a weak solution of an alkali, such as sodium hydroxide, potassium hydroxide or ammonia, or a combination of some or all of these alkalis at room temperature, the cellulose, fibrous and starchy parts of the fruit, and particularly grapes, will become so modified as to be more translucent and will stand boiling in water without a checking, cracking or splitting of the skin or an excessive softening of the pulp and will be able to absorb dyes, sugar and flavoring more readily than without such treatment. It has been found that an alkali solution, such as has been suggested above, at a strength of about 3% of the hydroxide, can be used very successfully at room temperature and up to as high as approximately 90° F., whereas with the stronger solutions, which may range up to an 8% hydroxide solution, it is desirable that the temperatures be somewhat lower. The principal point here is that the temperature of the solution will be determined by its hydroxide content and also upon the condition of the fruit. Experience, however, will teach the proper values for these variables.

As a further aspect of the present invention, I have also discovered that if the sulfite salt of some one or all of the alkalis mentioned above is added to the solution in proper proportion, the density of the solution will be increased and as a result, less difficulty will be encountered in regulating the temperature, concentration of solution, and time of treatment to the end that a more uniform product will result and at the same time the inclusion of these latter ingredients will prevent excessive discoloration by the hydroxide and thus reduce the necessity for bleaching to control the ultimate color of the fruit.

In the practice of the present invention, the skin of the fruit or vegetable is not removed, but is preserved intact and at the same time the skin and pulp are so modified that no separation occurs therebetween. The whole fruit becomes more translucent and jelly-like than before. This is accomplished by immersion in a cold caustic alkali solution, such as has been suggested above, and preferably at a temperature of not over 90° F. In a prior Patent No. 1,721,929, issued to me July 23, 1929, I disclosed a process involving the use of a caustic soda or lye solution for removing the skins of grapes, plums, prunes and the like. In this and all other prior disclosures of which I am aware, the processes are carried out with the solutions at a temperature of 170° F. to 212° F. or higher, whereas, in accordance with the present invention and as distinguished from my prior disclosure, the alkali solution is held at room temperature and preferably is not higher than 90° F. Alkali solutions at high temperatures, as suggested in my prior patent, destroy and/or dissolve the fruit skins and often some of the pulp when the process is carried out for too long a period and, therefore, and treatment requires careful control in the time of treatment to a matter of seconds. Whereas, in accordance with the present invention it has been discovered that the alkali solutions herein suggested, when maintained at workroom temperatures, do not destroy the skin or pulp of the fruit and, therefore, the treatment may be extended out over a period of several days or until the entire fruit is changed to the desired degree. This can be determined for any particular fruit by preliminary tests.

The process here disclosed appears to produce a change of the cellulose, starch and other vegetable components of the fruit and does not dissolve and/or remove any part thereof. In the practice of this process, the fruit is placed in vats and submerged in a solution of water to which has been added sufficient sodium hydroxide, potassium hydroxide or ammonia, or a combination of some or all of them to produce the required modification of the skin and pulp of the fruit; and also, if desired, there may be added to the solution, as suggested above, sufficient sulfite and/or sulfate of sodium, potassium, or ammonia, or a combination of some or all of these latter salts to prevent discoloration of the fruit by the hydroxides. This treatment prevents swelling of the fruit by osmosis and consequent splitting of the skin before the hydroxides have had time to make the skin and pulp sufficiently resistant to swelling and splitting. It has also been discovered that when common salt (sodium chloride) is added to the solution a more uniform result is obtained. This, it is believed, is explained by the fact that the salt also tends to increase the specific gravity of the solution and due to its affinity for water it prevents a too rapid absorption of water and a consequent swelling and cracking of the material undergoing treatment.

The required strength of the solution, when used with the sulfite and salt, depends upon the kind of material treated. For grapes and citrus fruits the following formula gives good results:

| | Per cent |
|---|---|
| Sodium hydroxide | 4 |
| Sodium sulfite | 3 |
| Sodium chloride | 5 |
| Water | 88 |

In quantity sufficient to cover the material treated.

With the above outlined formula it has been found that for the treatment of grapes a submergence of from ten to twenty-four hours is satisfactory, this period of time being dependent upon the size and condition of the fruit. It will be understood, of course, by those skilled in the art, that after the treatment by my above described method, the fruit and/or other substance so treated will be subjected to a washing operation to remove any excess chemical prior to any final steps, such as are practiced in canning, preserving, glazing and candying the product.

After this treatment, it will be found that the fruits or other substance, and particularly grapes, can be soaked in cold water or syrups for a long time and boiled for hours without any checking or splitting of the skin or softening of the pulp, whereas with untreated grapes, the skins will split within a few hours when soaked in cold water and the pulp will disintegrate in boiling water or syrups, thus making them unfit for use where the whole unbroken fruit is required.

In the treatment of citrus fruits and their peels, the principal advantage of my new process is that the color is lighter and brighter, the peel is more tender and homogeneous and voluminous due to the swelling of the fibres and their partial changing into jelly-like substances by the ingredients of my formula, thus enabling the peels so treated to take up and hold more of the sugars used in preserving and glazing the peel and increasing the product in volume and weight.

While I have, for the purpose of this description and in order to disclose the invention so that the same can be readily understood, described and illustrated the invention with a specific formula, I desire to have it understood that this invention is not limited to the specific means disclosed, but may be embodied in other ways that may suggest themselves to persons skilled in the art. For example, any one or more of the hydroxides enumerated above may be combined in substantially the proportions stated with any one or more of the sulfites above identified. It is also contemplated that the sulfate salts of one or the other of the above metal sulfites may also be substituted with good results. It is believed that this invention is new and it is desired to claim it so that all such changes and variations thereof as come within the scope of the appended claims are to be considered as part of this invention.

Having thus described my invention, what I claim and desire to secure by Letters Patent is:

1. The process of treating whole fruit and like substances as a preliminary to boiling as practiced in coloring, preserving, glaceing and candying, which comprises subjecting the fruit to the hydrolyzing action of a 3% to 8% sodium hydroxide solution at a temperature not substantially greater than 90° F. until the cellulose, fibrous and starchy part of the fruit has become modified and the skin is resistant to checking, cracking or splitting when subjected to a boiling temperature, and finally washing the solution from the fruit prior to its subsequent treatment.

2. The process of treating grapes as a preliminary to boiling as practiced in coloring, preserving, glaceing and candying, which comprises subjecting the whole grape to the hydrolyzing action of a 3% to 8% sodium hydroxide solution at a temperature not substantially greater than 90° F. and until the cellulose, fibrous and starchy part of the grape has become modified and its skin is resistant to checking, cracking or splitting when subjected to a boiling temperature, and washing the fruit so treated prior to the final coloring, preserving, glaceing or candying operations.

3. The process of treating grapes as a preliminary to boiling as practiced in coloring, preserving, glaceing and candying, which comprises subjecting the whole grape to the hydrolyzing action of a solution containing 3% to 8% sodium hydroxide, and approximately 5% sodium chloride, at a temperature not substantially greater than 90° F. until the cellulose, fibrous and starchy part of the grape has become modified and its skin is resistant to checking, cracking or splitting when subjected to a boiling temperature, and finally washing the fruit so treated prior to the final coloring, preserving, glaceing or candying operations.

4. The preliminary treatment of whole fruit to render the pulp and skin thereof resistant to softening, swelling, checking and splitting when subjected to cooking temperatures, as practiced in coloring, preserving, glaceing and candying, which comprises soaking the whole fruit in a solution containing 3% to 8% sodium hydroxide at a temperature not substantially in excess of 90° F.

5. The preliminary treatment for whole grapes, cherries, plums and like fruit to render the pulp and skin thereof resistant to softening, swelling, checking and splitting when subjected to cooking temperatures, as practiced in coloring, preserving, glaceing and candying, which comprises soaking the whole fruit in a solution containing 3% to 8% sodium hydroxide and approximately 5% sodium chloride at a temperature not substantially in excess of 90° F.

6. The preliminary treatment of whole fruit to render the pulp and skin thereof resistant to softening, swelling, checking and splitting when subjected to cooking temperatures, as practiced in coloring, preserving, glaceing and candying, which comprises soaking the whole fruit in a solution containing from 3% to 8% sodium hydroxide, approximately 3% sodium sulfite, and approximately 5% sodium chloride at a temperature not substantially in excess of 90° F.

7. In the process of preserving, glaceing and/or candying whole fruit, the step which comprises first soaking the whole fruit in a weak sodium hydroxide solution at a temperature not substantially greater than 90° F. until the cellulose, fibrous and starchy part of the fruit is rendered resistant to softening or swelling and the skin is rendered resistant to checking, cracking or splitting when subjected to treatment at higher temperatures during subsequent steps of the process.

8. In the process of preserving, glaceing and/or candying whole fruit, the step which comprises first soaking the whole fruit in a weak solution of sodium hydroxide and sodium chloride at a temperature not substantially greater than 90° F. until the cellulose, fibrous and starchy part of the fruit is rendered resistant to softening or swelling and the skin is rendered resistant to checking, cracking or splitting when subjected to treatment at cooking temperatures during subsequent steps of the process.

OTTO J. STEINWAND.